Dec. 29, 1942.     R. DIENER     2,306,476
GUN-LAYING MECHANISM
Filed Aug. 1, 1939     2 Sheets-Sheet 1

Inventor:
Richard Diener
By
Attorneys

Dec. 29, 1942.   R. DIENER   2,306,476
GUN-LAYING MECHANISM
Filed Aug. 1, 1939   2 Sheets-Sheet 2
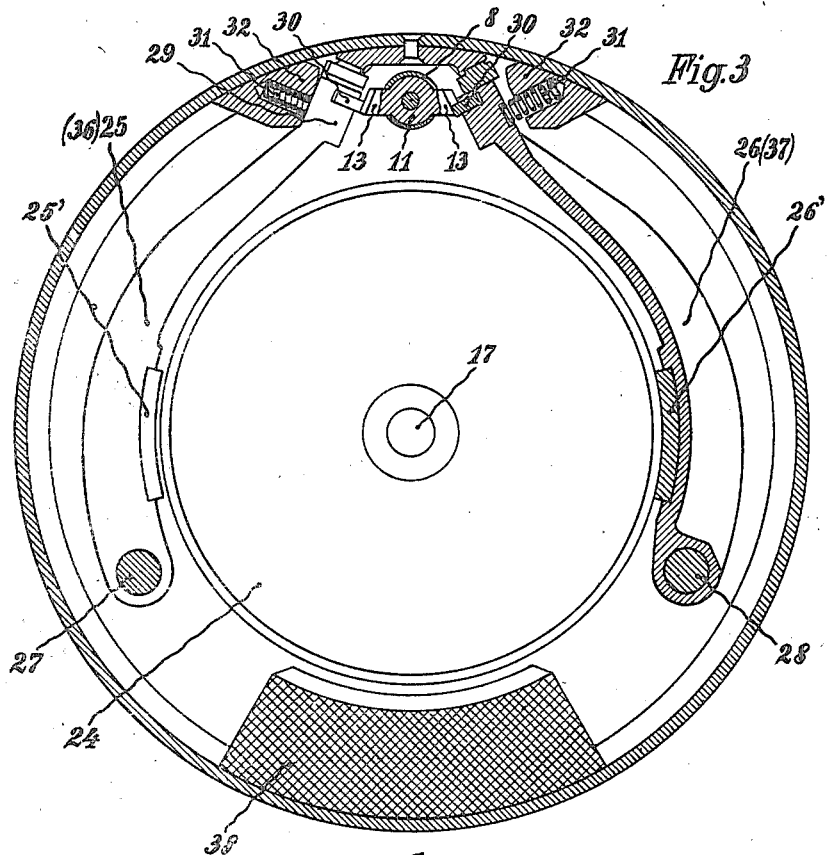
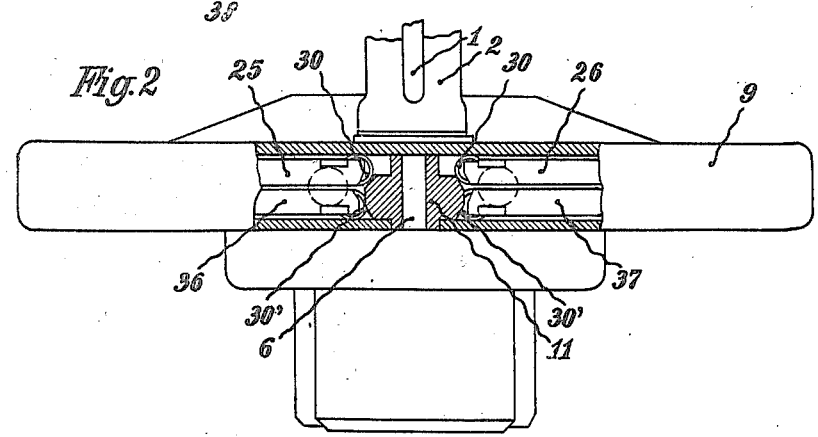
Inventor:
Richard Diener
By
Young, Emery & Thompson
Attorneys Patented Dec. 29, 1942

2,306,476

UNITED STATES PATENT OFFICE 2,306,476

GUN-LAYING MECHANISM

Richard Diener, Berlin-Hermsdorf, Germany; vested in the Alien Property Custodian Application August 1, 1939, Serial No. 287,842
In Germany December 30, 1938

6 Claims. (Cl. 74—362)

The specification of applicant's earlier patent application Ser. No. 243,640 describes and claims a gun laying mechanism which is adapted to be adjusted to different laying speeds by a handle which is combined with the crank handle of the laying handwheel. It is a disadvantage of this mechanism that the adjustment which can only be effected in stages is apt to be jerky and noisy.

The present invention, which is an improvement in or modification of the invention described and claimed in said application Ser. No. 243,640, avoids this disadvantage and also considerably simplifies and otherwise improves the mechanism.

The invention consists in gun-laying mechanism which is adapted to be adjusted to produce different speeds by a manually operable adjusting member combined with a manually operable control member so that the gun layer is able to actuate the adjusting member while actuating the control member with the same hand, which comprises a number of friction clutches adapted to couple the control member with a variable speed gearing arranged to produce a number of gun laying speeds, the gear ratio selected being determined by the position of the adjusting member.

The invention is illustrated by way of example in the accompanying drawings, in which—

Fig. 2 is a plan, partially in section, and

Fig. 3 is a section along line III—III of Fig. 1, seen in the direction indicated by the arrow.

Figure 1:
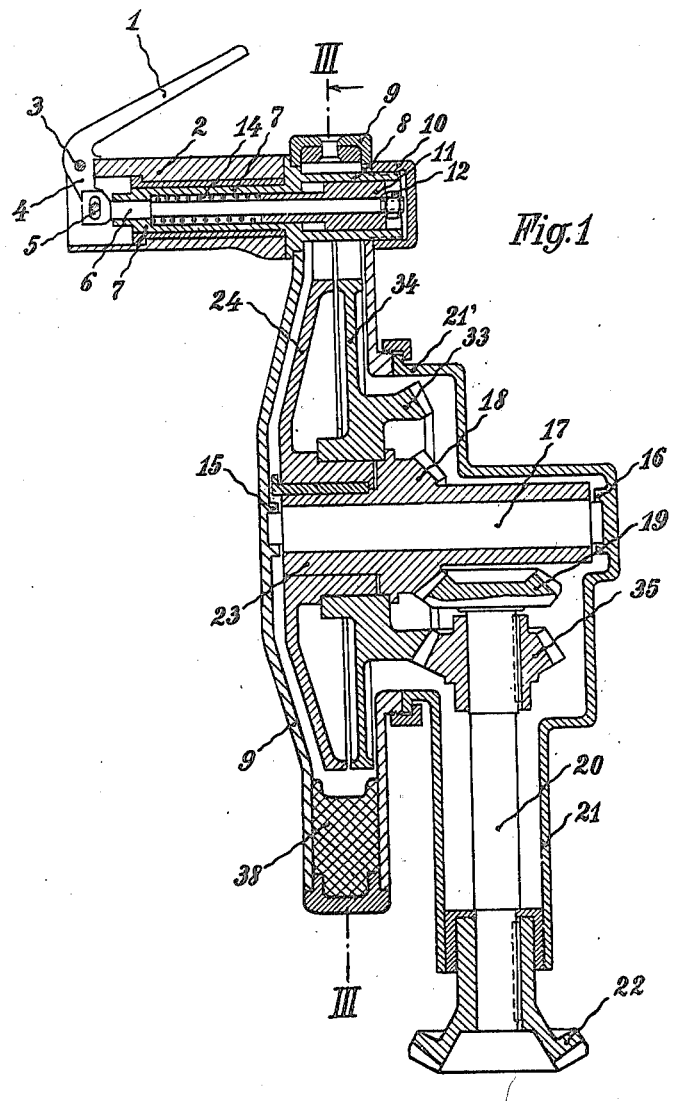
Fig. 1 is a longitudinal section through a laying mechanism.

The adjusting handle 1 is in the form of a bell crank lever, and is arranged to pivot about a pin 3 on the hollow crank handle 2 by which the mechanism is controlled. The shorter arm 4 of the handle 1 is inside the crank handle 2 and is engaged, by means of a pin 5, by a slot in the head of a stem 6 which is adapted to be displaced longitudinally in the crank handle 2. The bolt 6 is situated in a sleeve 7 which is integral with a sleeve 8 which has a greater internal diameter than the sleeve 7 and is provided at each side with a longitudinal slot. The sleeve 8 passes through the housing 9 of the hand-wheel and is screwed firmly on the housing 9 by a screw cap 10 which is screwed on the projecting end of the sleeve. The sleeve 8 encloses a stepped control plunger 11 which is held on the stem 6 by a nut 12. The control plunger 11 carries at both sides cams 13 (Fig. 3), which are guided in the longitudinal slots of the cylindrical part 8 and are bevelled at their end surfaces. Upon the smaller end of the plunger which slides in the sleeve 7 there acts a helical spring 14 which occupies the entire internal annular space between the sleeve 7 and the stem 6. The gear housing 21' which is to be fixed on the gun carriage is rotatably mounted on the housing 9 of the hand-wheel. The housing 21' and the housing 9 carry in cast step-bearings 15 and 16 a shaft 17, on which there is rotatably mounted a bevel pinion 18 from which the lower laying speed is derived. The toothed rim of the bevel pinion 18 engages a bevel pinion 19 which is mounted at the inner end of a spindle 20 arranged transversely with respect to the shaft 17. This spindle is surrounded by a tubular housing 21 and carries at the outer end a bevel pinion 22 which is brought into engagement with the toothed rim on the gun mounting.

The bevel pinion 18 is part of a sleeve 23 on which is keyed a clutch plate 24. As shown in Fig. 3, this clutch plate is engaged by two clutch arms 25 and 26, which are pivotally mounted symmetrically with respect to the housing 9 on bolts 27 and 28. The clutch arms 25, 26 carry on their inner sides friction blocks 25', 26' intended to make contact with the clutch plate 24, and have heads 29, in which guide rollers 30 (Figs. 2 and 3) are mounted. These are kept in constant engagement with the oblique surfaces of the control cams 13 by compression springs 31 which bear on the rear sides of the arms 25, 26. The springs 31 are mounted in abutments 32 which serve to limit the outward movement of the arms 25, 26. When the control piston 11 is adjusted as shown in Fig. 2, the guide rollers 30 are at the lowest positions on the bevelled ends of the cams 13 and, therefore, the friction blocks 25', 26' bear firmly against the clutch plate 24. When the rollers 30 rise to the apices of the bevelled ends the two clutch arms 25, 26 are moved away from the clutch plate 24.

The clutch plate 24 carries on the its hub a freely rotatable bevel wheel 33 from which the higher laying speed is derived and which is integral with a clutch plate 34. The bevel wheel 33 engages a bevel wheel 35 on the spindle 20. The clutch plate 34 is engaged on both sides by clutch arms 36, 37 which have guide rollers 30' and, in respect of their arrangement, shape and method of control, are similar to the clutch arms 25, 26.

The two clutch plates 24 and 34 can be brought, under the influence of the control piston 11, only alternately into engagement with the wheel housing 9 and thus with the crank handle 2.

The wheel housing 9 encloses the entire handwheel at the front and at the rear as far as the hub 21' of the fixed housing member 21, and carries in its rim a counterweight 38.

For laying the gun, the gun layer holds the crank handle 2 and turns the hand-wheel about the hub 21', whereby the members enclosed in the hand-wheel are moved about the shaft 17. In the initial position (Fig. 1), the handle 1 is in its outer position and the clutch arms 25, 26 bear firmly against the clutch plate 24. The bevel wheel 18 of the clutch plate 24 now drives the bevel wheel 19, thus laying the gun at the slow speed.

If it is desired to pass over the rapid laying in order to obtain a greater range of laying, the gunner presses the handle 1 in the crank handle 2 and thereby displaces the stem 6 against the influence of the spring 14. The guide rollers 30' of the clutch arms 36, 37 slide down the oblique surfaces of the control plunger 11, and at the same time the guide rollers 30 of the clutch arms 25, 26 are raised.

The clutch arms 36, 37 are thus caused to bear against the clutch plate 34, and the clutch plate 24 is released. A direct connection is thereby established between the crank handle 2 and the clutch plate 24, whereby the gun is laid through the bevel wheel 33 and the bevel wheel 35 at the higher speed.

I claim:

1. A gun laying mechanism comprising a gun laying shaft, a set of gears for actuating said shaft at a higher speed and a set of gears for actuating said shaft at a lower speed either gear set being operative while the other set is idle, means including a handle for operating said gear sets, friction clutches one associated with each set of gears, cam means arranged to permit engagement of either of said friction clutches while simultaneously disengaging the other friction clutch, and control means in said handle for selectively actuating said cam means whereby said handle will operate said gun laying shaft at either high or low speed.

2. A gun laying mechanism comprising a gun laying shaft, a set of gears for actuating said shaft at a higher speed and a set of gears for actuating said shaft at a lower speed either gear set being operative while the other set is idle, means including a handle for operating said gear sets, friction clutches one associated with each set of gears, said clutches including friction shoes mounted on arms, rollers on said arms, springs urging said arms and shoes into engaging position, cam means arranged to co-operate with said rollers to permit engagement of either of said friction clutches while simultaneously disengaging the other friction clutch, and control means in said handle for selectively actuating said cam means whereby said handle will operate said gun laying shaft at either high or low speed.

3. A gun laying mechanism comprising a gun laying shaft, a set of gears for actuating said shaft at a higher speed and a set of gears for actuating said shaft at a lower speed either gear set being operative while the other set is idle, means including a handle for operating said gear sets, friction clutches one associated with each set of gears, said clutches including friction shoes mounted on arms, rollers on said arms, springs urging said arms and shoes into engaging position, cam means arranged to co-operate with said rollers to permit engagement of either of said friction clutches while simultaneously disengaging the other friction clutch, control means in said handle for selectively actuating said cam means whereby said handle will operate said gun laying shaft at either high or low speed, and housings for said springs said housings constituting stops for the clutch arms in disengaged position.

4. Mechanism according to claim 3, in which the control means includes a stem slidable in the handle and carrying a cam actuating member, a bell crank lever jointed to said handle with a short arm connected by a pin and slot joint to said stem, and a spring holding said stem in one control position and against the action of which it is movable by said bell crank to the other control position.

5. A gun laying mechanism comprising a gun laying shaft, a set of gears for actuating said shaft at a higher speed and a set of gears for actuating said shaft at a lower speed either gear set being operative while the other set is idle, means including a handle for operating said gear sets, friction clutches one associated with each set of gears, cam means arranged to permit engagement of either of said friction clutches while simultaneously disengaging the other friction clutch, and control means in said handle for selectively actuating said cam means whereby said handle will operate said gun laying shaft at either high or low speed, and a housing in which said gear sets are mounted and having a wheel shaped part to which said handle and control means are attached said housing part serving as a handwheel to actuate the gun laying shaft, and a part completing the enclosure of the mechanism and in which the gun laying shaft is journalled.

6. Mechanism according to claim 5, including a shaft lying in the axis of the wheel shaped housing part, a disc member of one of the friction clutches rotatable on said shaft to which member is fixed a gear of one of the gear sets, and a disc member of the other friction clutch rotatably mounted on the hub of said first mentioned disc member and to which is fixed a gear of the other gear set.

RICHARD DIENER.